Aug. 16, 1938.   W. T. WELCH   2,127,317
VIBRATORY MOTION PRODUCING APPARATUS
Filed July 7, 1937   2 Sheets-Sheet 1

INVENTOR.
William T. Welch
BY
HIS ATTORNEY.

INVENTOR.
William T. Welch
BY
HIS ATTORNEY.

Patented Aug. 16, 1938

2,127,317

UNITED STATES PATENT OFFICE 2,127,317

VIBRATORY MOTION PRODUCING APPARATUS

William T. Welch, Westfield, N. Y., assignor to Ajax Flexible Coupling Company, a corporation of New York Application July 7, 1937, Serial No. 152,344

11 Claims. (Cl. 74—61)

This invention relates to vibratory motion producing apparatus of the inertia type.

I am familiar with apparatus of the above general type wherein weights mounted on a shaft or a plurality of shafts are rotatable about such shaft or shafts and wherein the lateral thrust stresses are communicated to such shafts. A relatively severe load is thus periodically imposed on the shaft and shaft bearings, and the severe usage to which the apparatus is subjected causes considerable wear of the bearings in a short period. Also, due thereto and due also to other resulting operating conditions, there is considerable tendency to effect misalignment of the shaft.

I have devised a vibratory motion producing apparatus of relatively simple construction wherein rotating weights have a rolling contact with a track or race element of an inner wall of an enclosing housing throughout their rotary movement thereby largely eliminating the load on the shaft or shafts upon which the weights are mounted, thereby permitting a relatively simple bearing construction to be employed, and adding considerably to the operating life of apparatus of this type.

It is an object of my invention therefore to provide a vibratory motion producing apparatus adapted for incorporation into "shaker drives" and the like comprising rotating weights, preferably in the form of rollers, mounted on or driven by a shaft and wherein the centrifugal force generated stresses are communicated to the wall elements of the enclosing housing.

Other objects of my invention and the invention itself will become increasingly apparent from a consideration of the following description of the drawings wherein Fig. 1 is an elevational view of a vibratory motion producing apparatus embodying my invention.

Figure 1:
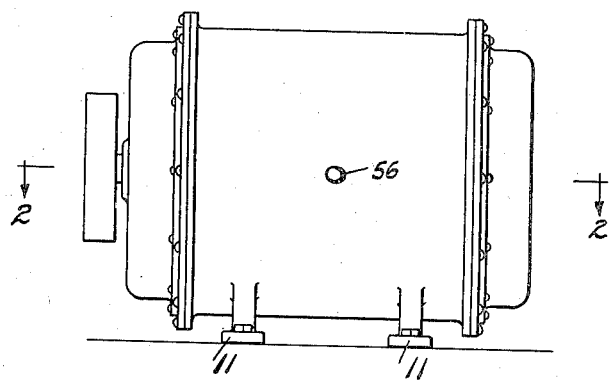

Referring now to the drawings which illustrate an embodiment of my invention without limitation of the true scope thereof, I have indicated generally at 10 a housing within which the motion producing apparatus is disposed and which is provided with a pair of integrally cast brackets 11 by which the housing may be rigidly secured to a screen or the like, which is to be shaken or vibrated. Screens or similar apparatus of this type are mounted to be freely vibrated and are well known in this art so that a detailed description is not believed necessary. The housing 10 comprises radially outwardly extending flanges 13 to which are detachably secured end plates 14 by means of screws 15 projected through the end plates and threadingly engaging the flanges 13.

The end plates each comprise an annular flange having a central hub portion 16 and a relatively laterally spaced perforated boss portion 17, generally centrally perforated cup-shaped cover elements 18 and 19 being detachably secured to the end plates as by means of screws 20 projected through radially outwardly extending flanges provided on the cover elements and threaded into the end plates 14.

A drive shaft 21 is rotatably supported by the hub portions 16 of the end plates and is extended through a central perforation 22 provided in one of the cover elements as 18, whereby it may be rotatably driven as by a pulley 23 secured thereto or in any other suitable manner. Encircling the shaft 21 at the perforation 22 of the element 18, is a lubricant packing washer 28 formed of felt or other suitable material and seated within a recess provided therefor in element 18.

Secured to the shaft 21 generally medially thereof is a weight driving element 25 comprising a hub portion 26 telescoped over shaft 29 and keyed thereto and provided with integral axially spaced and laterally extending forks or arms 27—27.

Disposed one on each side of the weight driving element 25 preferably relatively in longitudinally spaced relation on the shaft 21, are a pair of weight driving elements generally indicated at 30, each comprising a tube portion 31 rotatable on the shaft 21 and each having an end portion with gear teeth formed on one end thereof to provide a pinion 32. A hub 34 is telescoped over and keyed to each tube 31, and a pair of axially spaced and weight driving arms 33—33 extend radially from each hub 34 and support a roller weight 39 as subsequently described.

The radially outer end portions of arms 27 of the weight driving element 25 and arms 33 of the weight driving element 30 are similarly formed to provide generally rectangular open ended slots 35 each having longitudinally extending guiding grooves 36—36 formed in the lateral walls of the slot. Generally rectangular bearing blocks 37, provided with lateral slide key tongues 38—38 engaged within the grooves 36 of each driving arm, are slidably disposed within the slots 35 of the driving arms.

The bearing blocks 37 for each pair of arms 27 and 33, rotatably support the ends of roller pins 39' and 40' axially presented by the roller weights respectively shown at 39 and 40. Although I prefer that the roller weights be fixedly secured on the pins 39' and 40', they may be rotatable thereon, and the shafts fixed in blocks such as those shown at 37 and also at 63, Fig. 5.

Rotatably disposed within bearing boss portion 17 of each end plate 14 is a shaft 45 to which at its two ends is keyed a gear 46 meshing with the pinion 32, and a pinion 47 meshing with an internal ring gear 48 which is keyed to the shaft 21. Each ring gear 48 and pinion 47, are encased between an end wall 14 and cover plate 18 or 19, at the two ends of the housing 10.

The inner walls of the cylinder portion 12 of the housing are formed to provide preferably raised, either integral or secured annular bearing race or track surfaces 50—50 traversed by the roller weights 39 during rotary movement and a similar intermediate annular bearing surface 51 is provided as a race or track for the roller weight 40 during its rotary movement. It will now be apparent that when the shaft 21 is rotated preferably by a belt or other flexible drive as through the pulley 23, that the medial driving element 25 keyed thereto will be rotated therewith.

Figure 5:
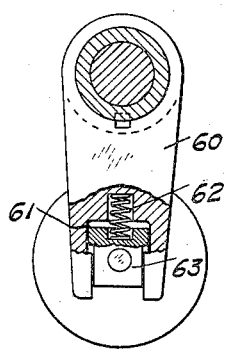
Fig. 5 is an elevational view partially in section, showing a modified means of mounting the roller weight.

The medial roller weight 40 during rotary movement will be maintained in contact with bearing surface 51 of the housing due to centrifugal force which may be supplemented by the effect of springs 62, as in Fig. 5, since the bearing blocks 37 are permitted sufficient radial movement to constantly effect this.

Radial thrusts are therefore directly transmitted to the housing and are not exerted against the shaft 21, as in prior constructions.

The pinions 47, meshing with the ring gear 48 will be rotated in the same direction as the ring gears and shaft 21, as will also gears 46 since the pinions 47 and gears 46 are both keyed onto the same shafts 45. The pinions 32 meshing with the gears 46 will be rotated in the reverse direction relative to the direction of rotation of the shaft 21 and ring gears 48 as will also the laterally disposed roller weights 39, which are keyed onto the tubular extensions 31 of the pinions 32.

Analagous to the well understood principle, the roller weights 39 and roller weight 40 thus rotating in opposite directions will periodically transmit an oscillatory or vibratory motion to the housing 10 and resultantly to the screen or the like apparatus to which the housing 10 is secured. The aggregate weight of the roller weights 39 and associated rotating parts is preferably substantially the same as the weight of the roller weight 40, and its associated rotating parts and the center of gravity of the movable parts in each instance, is preferably the same distance from the shaft axis, the inertia effect of the parts rotating in opposite directions being thus substantially equalized.

I preferably maintain a supply of fluid lubricant in the housing to a level which may be as indicated at 55, so that the rotating parts may transmit the lubricant to various parts of the apparatus. To this end, I provide a lubricant nipple 56 having a stem portion threadedly engaging a perforation provided in the housing wall. Lubricant nipples of this type are well known and any desired type may be employed wherein the egress of lubricant is prevented upon removal of the lubricant supply source.

It will be noted that since the roller weights are in contact with the inner walls of the housing during their rotary movement that the shaft 21 is largely relieved of load which would be otherwise imposed thereon and the shaft is subjected mainly to driving torque thereby largely eliminating the severe conditions to which a shaft and bearing construction absorbing both the centrifugal force and the driving torque would be subjected. Also, the elimination of the major centrifugal force on the shaft reduces any tendency for the shaft to become misaligned through wear. Although I have illustrated a single shaft, I contemplate any equivalent means may be employed, and which may comprise a plurality of shafts or driving tubes or the like.

Figure 2:
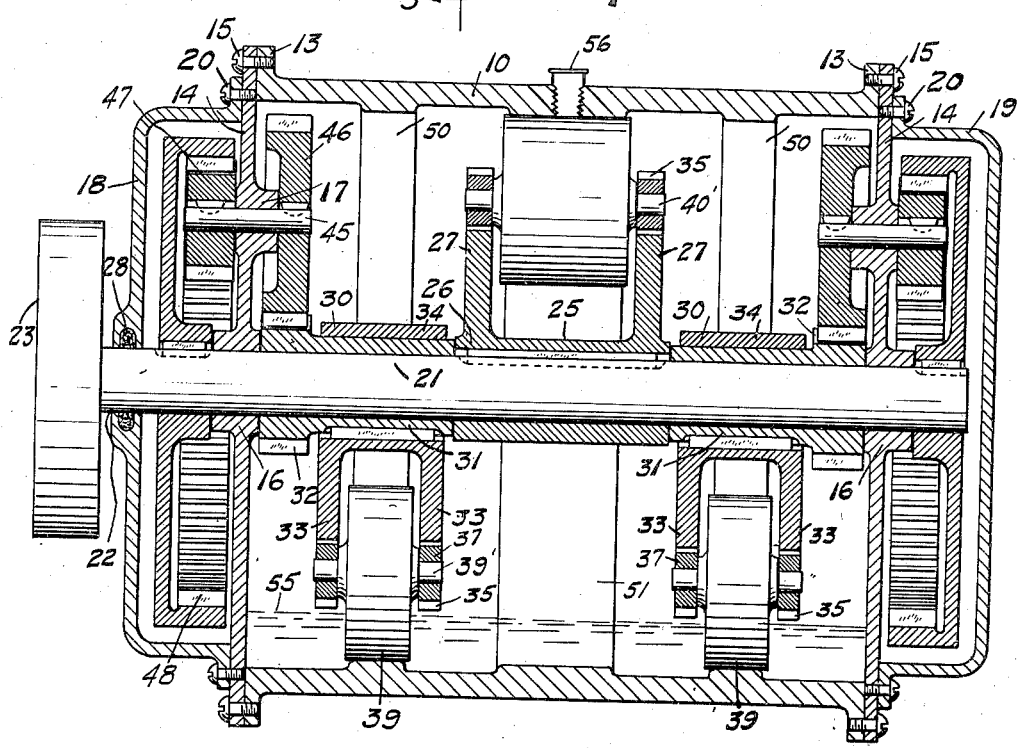
Fig. 2 is a longitudinal section taken along line 2—2 of Fig. 1.
Figure 3:
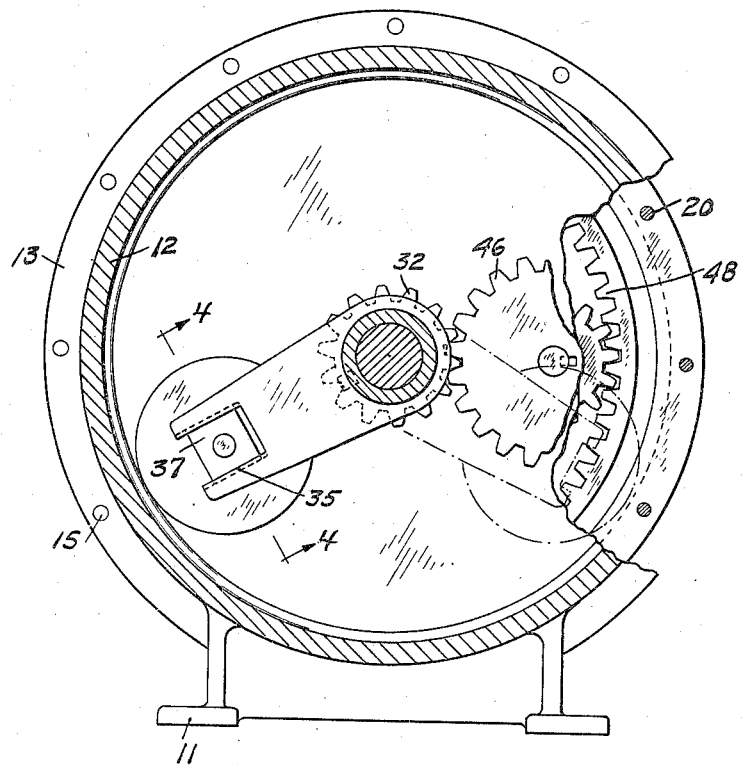
Fig. 3 is a transverse section taken along the line 3—3 of Fig. 2 with parts broken away for better illustration.
Figure 4:
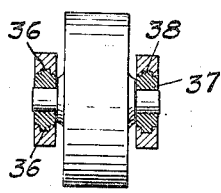
Fig. 4 is a section taken along the line 4—4 of Fig. 3.

Such wear as may occur between the roller weights and their bearing surfaces, is automatically compensated for, through a slight radially outward movement of the roller weights under the impulse of centrifugal force when operating the apparatus. The parts of the apparatus may be quickly assembled and disassembled and permits the elimination of expensive bearing parts though providing a relatively inexpensive durable low-friction rugged construction. The bearing surfaces 50 and 51 are, preferably, as shown in Fig. 2, narrower than the roller weights which they contact, thereby eliminating any tendency, otherwise had, for the relatively hard roller weights to wear a groove in the bearing surfaces.

Referring now to Fig. 5, I have shown a modification of my invention wherein the driving arms 60 are bored at the base of the slot 61 to receive a compression spring 62 and the opposite spring end is seated within a depression formed in the bearing block 63, whereby the spring will continuously urge the bearing block together with its supported shaft and roller weight radially outwardly to maintain the weight in contact with the inner walls of the housing and forming a supplemental wear take-up, and such spring is preferably made of such strength as to eliminate all tendency of the weights to momentarily leave their tracks during any operation of the apparatus.

Figure 6:
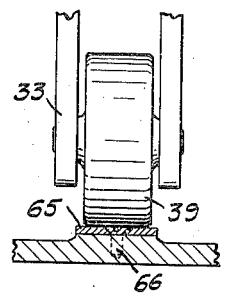
Fig. 6 is a fragmentary view showing a wear plate associated with the roller weight.

In Fig. 6, I have illustrated a further modification of my invention wherein hardened annular wearplates 65 telescoped within the inner walls of the housing form the bearing surface for the roller weights. The plates 65 are preferably maintained in position in any suitable manner, as by counter-sunk screws or the like 66, or by welding.

Although I have shown and described merely present preferred forms of my invention, I contemplate that numerous and extensive departures within the scope of the appended claims may be made therefrom without departing from the spirit of my invention.

Having thus described my invention, what I claim is:

1. In a vibratory motion producing apparatus, a housing adapted to be connected to a device to be vibrated by bodily induced vibrations of the housing, a plurality of roller weights within the housing adapted to rollingly engage the housing inner walls, driving means to cause each of said weights to revolve in an orbit on said walls, said driving means including elements rotatable in opposite directions and engaging the weights whereby some of said weights are revolved in a direction reverse to other of said weights, and the weights being arranged to balance each other.

2. In a vibratory motion producing apparatus, a bodily vibratable housing adapted to be connected to a device to be vibrated, a driving shaft rotatably mounted in the housing, a plurality of weights revolvable about the shaft axis, means drivingly interconnecting the shaft and weights, said driving means including elements rotatable in opposite directions, whereby at least one of said weights is rotated in an opposite direction from another of said weights, each of said weights having a center of gravity radially spaced from the shaft axis, and the weights balancing each other whereby the shaft will assume successive parallel positions due to the forces of the rotating weights.

3. In a vibratory motion producing apparatus, a tubular housing adapted to be secured to a device to be vibrated, a rotatable driving shaft mounted longitudinally of the housing, a roller weight element disposed radially of the shaft and supported thereby, said weight element revolvable in an orbit encircling the shaft axis and rollingly engageable with an inner wall of the housing, a second roller weight element disposed laterally of the shaft axis and revolvable in an orbit encircling said axis, said second element spaced longitudinally of said housing from said first element, also rollingly engaging the housing inner walls, and driving means comprising gearing driving said shaft and one of said elements in one direction of revolution and said other element in a relatively reverse direction.

4. In a vibratory motion producing apparatus, a housing adapted to be secured to a device to be vibrated, a rotatable drive shaft extending within said housing, a plurality of driving elements each comprising a hub portion encircling the shaft and a pair of axially spaced and radially extending arms rotatable with the hub portion, means for revolving adjacent driving elements in opposite orbited directions upon rotation of the drive shaft, a plurality of generally cylindrical weights each rotatably supported by a pair of arms about an axis parallel to the shaft axis and spaced therefrom whereby the weights when revolving in their respective orbits may rollingly contact the inner walls of the housing, and the support means for the weights comprising weight carrying bearings radially movable according to the orbit limiting dimensions of said housing inner walls.

5. The apparatus as described in claim 4 and comprising spring means engaging the bearings resiliently maintaining the weight in contact with the housing inner walls.

6. In a vibratory motion producing apparatus, a housing adapted to be secured to a device to be vibrated comprising a main housing portion having spaced annular bearing portions formed on the inner walls thereof, detachable end plates secured to the housing main portion, a drive shaft rotatably supported by the end plates, a pair of ring gears each keyed to the shaft externally of the end plates, a pair of pinions each meshing with a different ring gear and rotatably supported by the end plates at a point spaced from the shaft axis, a pair of driving gears each operably connected to a different one of said pinions and disposed internally of the end plates, a pair of spaced driving elements rotatable on the shaft by pinions engaging the driving gears and each comprising a pair of radially extending arms, a pair of roller weights each supported by the arms of a different driving element about an axis spaced from the shaft axis and each being adapted to rollingly engage a bearing surface, and a third driving element rotatable with the shaft and supporting a third roller weight, adapted to rollingly engage a bearing surface, and cover means for the ring gears detachably secured to the end plates.

7. In a vibratory motion producing apparatus, a housing adapted to be connected to a device to be vibrated by bodily induced vibrations of the housing, a plurality of roller weights within the housing adapted to rollingly engage the housing inner walls, means for causing each of said weights to revolve in an orbit upon said walls, said means including elements rotatable in opposite directions whereby some of said weights will be revolved in one direction and the other weights in the opposite direction, and the forces due to the weights revolving in a given direction tending to oscillate the shaft in a plane including the shaft axis being substantially balanced by the forces due to the weights revolving in the opposite direction.

8. In a vibratory motion producing apparatus, a generally cylindrical housing adapted to be secured to a device to be vibrated, a drive shaft supported axially of the housing, a plurality of weights adapted to rollingly engage the inner walls of the housing cylindrical portion and supported by the shaft with the center of gravity of each weight being spaced from the shaft axis, means for revolving some of said weights in one direction and the other weights in the opposite direction, and the weights being arranged so that the composite centrifugal force tends to move the housing bodily without tendency to rotate about an axis intersecting the shaft axis.

9. The apparatus as described in claim 3 and comprising a hard, annular wear strip detachably secured to the inner wall of the housing to engage a roller weight adapted to roll on said wear strip.

10. The apparatus as described in claim 3 comprising a hard, annular wear strip detachably secured to the inner wall of the housing to engage a roller weight adapted to roll on said wear strip, and said roller weight having a wear strip engaging portion narrower than the engaged surface of said wear strip.

11. In a vibratory motion producing apparatus, a housing adapted to be connected to a device to be vibrated by bodily induced vibrations of the housing, a plurality of roller weights within the housing adapted to rollingly engage the housing inner walls, driving means to cause each of said weights to revolve in a direction reverse to other of said weights, the weights being arranged to balance each other, and the housing lower portion forming a lubricant reservoir where the revolving weights may pick up lubricant to lubricate the housing inner wall orbit portion.

WILLIAM T. WELCH.